(12) United States Patent
Oliver

(10) Patent No.: US 7,471,509 B1
(45) Date of Patent: Dec. 30, 2008

(54) SHOCK PROTECTION FOR DISK DRIVE EMBEDDED IN AN ENCLOSURE

(75) Inventor: Daniel B. Oliver, San Jose, CA (US)

(73) Assignee: Maxtor Corporation, Longmont, CO (US)

(*) Notice: Subject to any disclaimer, the term of this patent is extended or adjusted under 35 U.S.C. 154(b) by 413 days.

(21) Appl. No.: 11/240,752

(22) Filed: Sep. 30, 2005

Related U.S. Application Data

(60) Provisional application No. 60/617,257, filed on Oct. 8, 2004.

(51) Int. Cl.
*H05K 5/00* (2006.01)
*H05K 7/00* (2006.01)
*A47B 81/00* (2006.01)

(52) U.S. Cl. ........................ 361/685; 361/684; 361/728; 312/223.2

(58) Field of Classification Search ......... 361/683–685, 361/728; 312/223.2; 248/634; 267/136
See application file for complete search history.

(56) References Cited

U.S. PATENT DOCUMENTS

| | | | | |
|---|---|---|---|---|
| 4,831,476 A | * | 5/1989 | Branc et al. | 360/97.02 |
| 5,041,924 A | * | 8/1991 | Blackborow et al. | 360/69 |
| 5,535,092 A | * | 7/1996 | Bang | 361/685 |
| 5,587,854 A | * | 12/1996 | Sato et al. | 360/97.01 |
| 6,034,841 A | | 3/2000 | Albrecht et al. | |
| 6,278,574 B1 | | 8/2001 | Wakita et al. | |
| 6,304,440 B1 | * | 10/2001 | Lin | 361/685 |
| 6,359,836 B1 | * | 3/2002 | Sevier et al. | 361/725 |
| 6,426,847 B1 | | 7/2002 | Dague et al. | |
| 6,496,362 B2 | * | 12/2002 | Osterhout et al. | 361/685 |
| 6,519,110 B2 | | 2/2003 | Dague et al. | |
| 6,545,865 B2 | | 4/2003 | Albrecht et al. | |
| 6,606,242 B2 | * | 8/2003 | Goodman et al. | 361/685 |
| 6,661,604 B2 | * | 12/2003 | Hashizume et al. | 360/97.02 |
| 6,704,161 B1 | | 3/2004 | Pham et al. | |
| 6,735,043 B2 | | 5/2004 | Bernett et al. | |
| 6,873,524 B2 | | 3/2005 | Kaczeus, Sr. et al. | |
| 6,999,909 B1 | | 2/2006 | Subrahmanyan | |
| 7,023,657 B2 | | 4/2006 | Sohn et al. | |
| 7,106,582 B2 | | 9/2006 | Albrecht et al. | |
| 7,106,583 B2 | * | 9/2006 | Koh et al. | 361/685 |
| 7,113,398 B2 | * | 9/2006 | Oba et al. | 361/685 |
| D534,911 S | | 1/2007 | Hisatsune | |
| 7,312,982 B2 | * | 12/2007 | Bruner et al. | 361/685 |
| 2002/0043608 A1 | * | 4/2002 | Nakata et al. | 248/560 |
| 2002/0044416 A1 | * | 4/2002 | Harmon et al. | 361/685 |
| 2002/0051338 A1 | * | 5/2002 | Jiang et al. | 361/685 |
| 2003/0011980 A1 | | 1/2003 | Albrecht et al. | |
| 2003/0174464 A1 | * | 9/2003 | Funawatari et al. | 361/685 |
| 2004/0032711 A1 | * | 2/2004 | Kaczeus et al. | 361/685 |
| 2004/0228073 A1 | * | 11/2004 | Chuang | 361/679 |
| 2005/0047077 A1 | * | 3/2005 | Koh et al. | 361/685 |

* cited by examiner

*Primary Examiner*—Jayprakash N Gandhi
*Assistant Examiner*—B. H Thomas
(74) *Attorney, Agent, or Firm*—Leanne Taveggia Farrell; Westman, Champlin & Kelly, P.A.

(57) ABSTRACT

A shock absorbing device for protecting a hard disk drive housing found primarily in portable electronic devices. The shock absorbers include protuberances that emanate from the body of the shock absorber and that extend through apertures provided in the enclosure. Thus, the physical shock is taken up by the body of the shock absorber as well as the protuberances, which increase the compression height of the shock absorber and increase the shock damping characteristics of the shock absorber. This permits decreasing the size of the enclosure, which is often desirable to consumers.

21 Claims, 4 Drawing Sheets

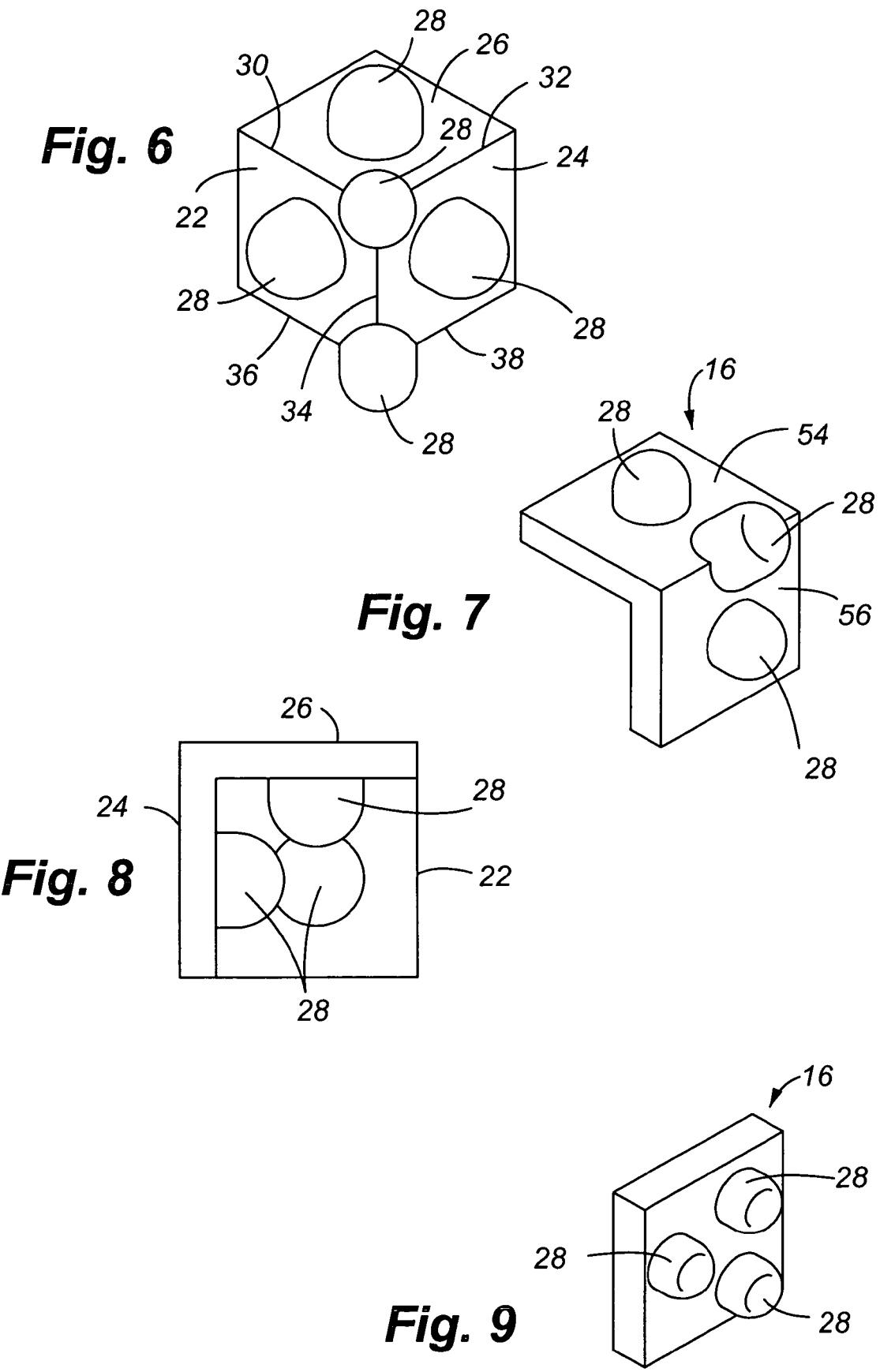

SHOCK PROTECTION FOR DISK DRIVE EMBEDDED IN AN ENCLOSURE

CROSS REFERENCE TO RELATED APPLICATIONS

This application claims the benefit of U.S. Provisional Patent Application Ser. No. 60/617,257 filed Oct. 8, 2004, which is incorporated by reference herein in its entirety.

FIELD OF THE INVENTION

The present invention relates to a shock absorbing device that protects a magnetic hard disk drive against the effects of physical shocks. More particularly, the available compression height of the shock absorber is increased to reduce the effects of high impact events while maintaining or decreasing the overall size of the enclosure surrounding the disk drive.

BACKGROUND OF THE INVENTION

Electronic devices such as laptops, personal data assistants (PDAs), MP3 players, CD players, etc., are very popular. However, these mobile devices often utilize delicate and expensive components, such as magnetic disk drives, that are prone to damage when dropped. Because of the small size and portability of these devices, they are prone to be dropped, particularly as the devices decrease in size. In addition, the devices are often more apt to experience undesirable dynamic (i.e., inertial) loading from drops or falls due to the very fact that they are mobile.

For many reasons, hard disk drives are positioned in sealed, rigid containers or housings. Nevertheless, disk drives used in portable devices are often positioned in a second, larger enclosure before being installed or embedded in the portable device (such as a laptop or MP3 player). The outer enclosure provides additional protection for the disk drive, and also provides space and protection for other electronic components, such as circuit boards, which are utilized in conjunction with a hard disk drives. FIGS. 5A, 5B and 5C illustrate a disk drive housing 12 which, in turn, is positioned in an outer enclosure 14. Shock absorbers 16 are added to decrease the amplitude and generally increase the duration of a shock impulse load and thereby improve survivability of the disk drive. Shock absorbers 16 may be positioned between the housing 12 (FIG. 5A) and an outer enclosure 14, they may be positioned solely on the exterior of the enclosure 14 (FIG. 5B), or both (FIG. 5C).

The objective of a shock absorber used with a disk drive in a mobile product is to reshape the frequency spectrum associated with the energy generated by the shock event in a way that eliminates or reduces damage. Typically, high impact shock events, such as dropping a mobile device containing a disk drive on a hard surface, generate a high amplitude, short duration pulse or shock wave. A shock absorber attempts to decelerate the falling device to reduce the amplitude of the shock pulse by increasing the duration of the shock pulse and/or to dissipate the energy through the deformation of the absorber caused by the resulting impact. Materials having rubber-like characteristics are good shock absorbers because they tend to attenuate high frequency pulses. Energy absorbing materials may be used to dissipate energy as the material is deformed. However, material composition is not the sole factor in selecting a shock absorber. Another factor is thickness or available compression height. Together, material stiffness property, cross-sectional area and available compression height are optimized to achieve the desired frequency spectrum for a given input pulse. To fully or sufficiently absorb a high amplitude shock, the shock absorber must not fully compress or bottom out before the shock pulse is dissipated. Shock absorber thickness or size is a function of the disk drive mass, shock input pulse (amplitude and duration), absorber material properties, and the anticipated shock levels at the worst case shock input pulse scenario. A thick material may be soft. A stiff material may not compress enough. Another factor is space. Where space is a premium, such as in the context of the present invention, the compression height of the shock absorber may be restricted. Optimally, all available space should be considered when designing the characteristics of a shock absorber, including when designing the compression height. A shock absorber also needs space to deform upon deceleration. If its deformation is constrained or hampered, the full potential of the shock absorption characteristics will not be achieved. The greater the available compression or sway space, the more the space can be utilized to optimize the characteristics of the shock absorber.

The prior art methods of FIGS. 5A, B and C have drawbacks. Adding shock absorbers 16 to the exterior of the enclosure 14 (FIG. 5B) increases the size of the enclosure 14 which also increases the size of the overall envelope, i.e., the external dimensions of the electronic device (the laptop computer, MP3 player, etc.). Adding shock absorbers solely between the housing 12 and enclosure 14 (FIG. 5A) or both inside and outside the enclosure 14 can also increase the overall dimensions of the envelope. However, a primary marketing concern for mobile devices is their size. Typically, the larger size of the components, the larger the end product will be. Thus, the larger the external envelope of the disk drive enclosure 14, the larger the entire finished product will be. Moreover, as mobile products decrease in size, the thickness of the outer enclosure 14 tends to increase in order to maintain or enhance protection due to the fact that the smaller form factor affords less protection to the disk drive. An increase in the thickness of enclosure 14 also adds to the increase in overall envelope size. Similarly, as the overall size of the portable device decreases in size, the thickness of the enclosure 14 becomes a larger percentage of the thickness of the overall device. Thus, the shock absorbers are an increasing factor in the overall size of the portable device.

In the environment of a portable consumer electronic product, utilizing shock absorbers solely on the outside of the outer enclosure 14 (FIG. 5B) is unacceptable. Exterior only shock absorbers increase the exterior dimensions of the overall envelope when space is at a premium. Additionally, externally mounted shock absorbers or bumpers do not eliminate the need for internal shock protection located between the disk drive housing and the enclosure due to the compression height and compression travel required of the external shock absorbers to sufficiently dampen a high amplitude shock load. In this regard, external shock absorbers do not fully or optimally use the space occupied by the enclosure 14 for shock absorber compression. In fact, available compression space, i.e., the space 18 inside the enclosure 14 and outside the housing 12 is wasted. Another drawback is that exterior bumpers are typically separate parts that add both component and assembly cost. For example, adhesives are often required to affix the shock absorbers to the external enclosure of the disk drive which increases assembly time and cost.

Positioning shock absorbers 16 only in the space between the disk drive housing 12 and the interior of the enclosure 14 (FIG. 5A) also has drawbacks. Input shocks to the absorber 16 are more severe since the hard outer enclosure 14 experiences the full load of the shock event and passes short duration shocks directly to the shock absorber resulting in high amplitude, short duration pulses that the absorber must dissipate to avoid exciting critical resonances of the disk drive. The enclosure 14 is also more susceptible to cracking or breaking. To avoid damage to the enclosure 14 while providing the same damping as the embodiments of FIGS. 5B and C, the thickness of the enclosure 14 must be increased. To achieve optimal design characteristics, the internal shock absorbers will need to be of a size that either compels an increase in the size of the overall envelope of the enclosure, thus making the entire system larger in size, or the available space and anticipated shock loads used to design the shock absorber will limit any future reduction in size of the envelope.

Similarly, although the embodiment in FIG. 5C advantageously increases the size and volume of the shock absorbers, thereby providing enhanced protection against shocks, it also increases the overall envelope size. However, in the environment of portable electronic devices, unlimited space is not available. Indeed, the design objective is to reduce space requirement, not add to it.

Thus, there is a long felt need in the field of disk drive fabrication to provide a device that protects the disk drive from the harmful effects of physical shock loads while maintaining or decreasing the disk drive's external envelope. Alternatively, there is a need to optimize the use of existing space to increase protection against physical shock loads. The following disclosure describes an improved shock absorber that includes a plurality of protuberances that pass through the outer enclosure to optimize use of space and substantially reduce the effects of high amplitude shock loads.

SUMMARY OF THE INVENTION

It is one aspect of the present invention to provide a shock absorbing system for use with a disk drive that is contained in an external enclosure, which enclosure is then incorporated into a portable end product, such as a laptop computer, PDA, consumer electronic device or the like. Moreover, it is an aspect of the present invention to provide the shock absorbing system without increasing the physical size of the enclosure and, preferably, reducing the physical dimensions of the enclosure, thereby facilitating reducing the size of the portable end product. More specifically, one embodiment of the present invention includes one or more shock absorbing devices that are positioned between the external corners of the disk drive housing and the internal corners of the external enclosure containing the disk drive housing and, perhaps, other components. The shock absorbers include a plurality of protuberances that extend from mutually orthogonal portions of the shock absorbers. To increase the shock absorbing characteristics of the shock absorbers, the protuberances extend through openings in the enclosure. The additional compression height gained by extending the protuberances through the enclosure provides additional damping and significantly lowers the amplitude of an input shock pulse for a given overall height of the absorber, including the enclosure thickness. Further, the protuberance increases the duration of a drop onto a hard surface by transferring deformation energy into the body portions of the shock absorber, thereby causing the body portions to deform and substantially dissipating the shock energy. It should be appreciated that the shock absorbers are not limited to a position at the corners of the disk drive housing or enclosure. The shock absorbers may be positioned along edges or on surfaces.

The protuberances are also adapted to deform in many directions to help protect the disk drive in any orientation. More specifically, since the protuberances emanate from the enclosure, they are more apt to receive the initial impact which may be felt in an axial or lateral direction, i.e., glancing blows. Thus, since the protuberances help dissipate the shock in their own right, the body portions of the shock absorbers may be made thinner overall.

The location of the shock absorbers, as well as the location of the protuberances on the shock absorbers, may vary depending upon the design criteria for the end product. In one embodiment of the present invention, shock absorbers are located adjacent to the enclosure corners thereby increasing the odds that the shock absorber will take the brunt of an impact. However, one skilled in the art will appreciate that shock absorbers may be placed along an entire edge of a disk drive with protuberances extending through the enclosure at discrete or expanded areas. The shock absorbers may also be placed at one or more locations along the surfaces of the enclosures, rather than simply at corners and edges. One skilled in the art will also appreciate that any combination of these concepts may be employed without departing from the scope of the invention.

It is yet another aspect of the present invention to provide a shock absorber that is easy to construct. Protuberances may be molded or machined into the body portions of the shock absorbers. In addition, the cavity may be formed in the shock absorber after molding or directly molded into the shock absorber. The cavities allow the absorber to more fully or completely fit on intended surfaces by accommodating variations in surfaces and edges. The materials utilized for the shock absorber of the present invention are generally known in the art. One embodiment of the present invention utilizes rubber, however, any resiliently deflectable material capable of elastic deformation may be utilized without departing from the scope of the invention. Further, although a generally hemispherical protuberance is shown herein, one skilled in the art will appreciate that columnar, prismatic, pyramid or any other shape of protuberance may be utilized without departing from the scope of the invention. The present invention also does not require any new assembly steps to be implemented and adhesives are not necessarily required. The shock absorbers are capable of a friction fit.

Still yet another aspect of the present invention is to provide a shock absorber that is compatible with many types of enclosures. A standard enclosure with upper and lower halves may be used wherein the halves are retrofitted somewhat so that apertures are provided for the receipt of the protuberances. Also, enclosures with sides, top or bottom openings may be employed in some electronic devices, which are easily used in conjunction with shock absorbers of the present invention.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

FIG. 6 is a perspective view of one embodiment of a shock absorber of the present invention;

FIG. 7 is a perspective view of a second embodiment of a shock absorber of the present invention; and FIG. 8 is a front elevation view of an alternative embodiment of the shock absorber shown in FIG. 6.

FIG. 9 is a perspective view of a further alternative embodiment of the shock absorber of the present invention.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Figure 4:
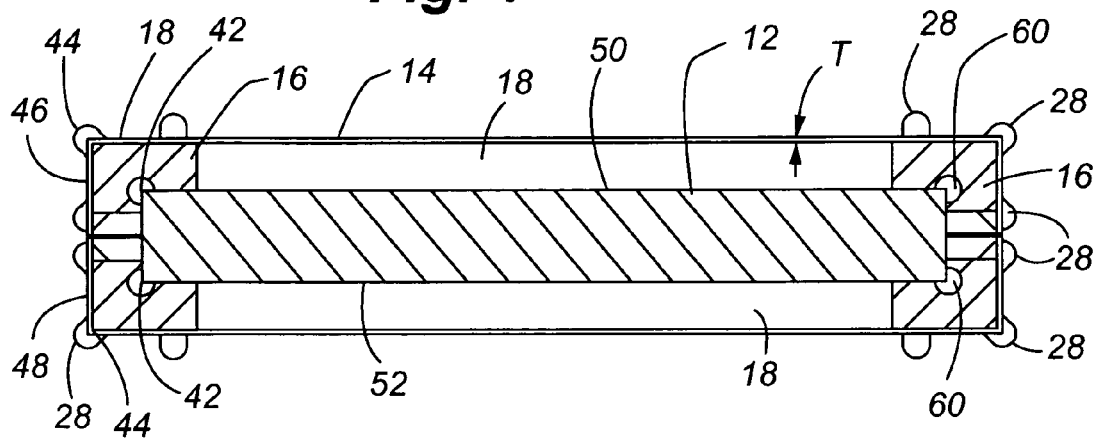
FIG. 4 is a cross section taken along line 4-4 of FIG. 2, but illustrates an alternative embodiment of the shock absorbers.
Figure 5A:
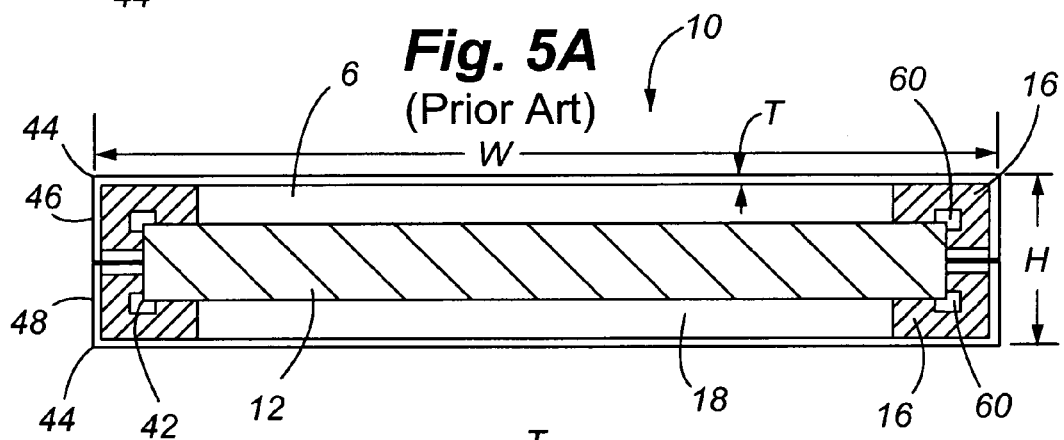
FIG. 5A is a front cross sectional view, similar to that of FIG. 4, showing a prior art embodiment of a shock absorber system.

Referring to FIGS. 5A, B and C, three representative prior art disk drive housings 12 are shown which, in turn, are positioned in an outer envelope or enclosure 14. A space 18 is formed between the disk drive housing 12 and the enclosure 14, allowing room for other components, such as circuit boards, batteries, liquid crystal displays (LCDs), associated with the operation of the disk drive, as well as providing space for deflection of the enclosure. An actual hard disk drive is mounted within the housing 12, as is represented in FIG. 4. Disk drives generally are comprised of one or more rotating disks D and an associated actuator assembly A with at least one read/write element E for the storage and the access of data.

Figure 5B:
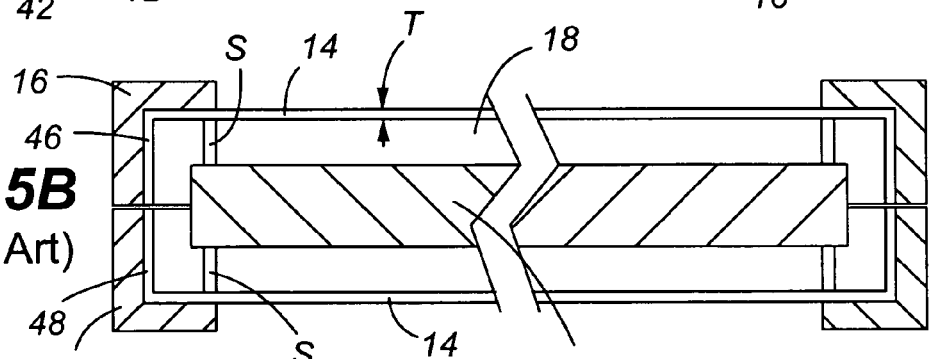
FIG. 5B is a front cross sectional view, similar to that of FIG. 4, showing a second prior art embodiment of a shock absorber system.
Figure 5C:
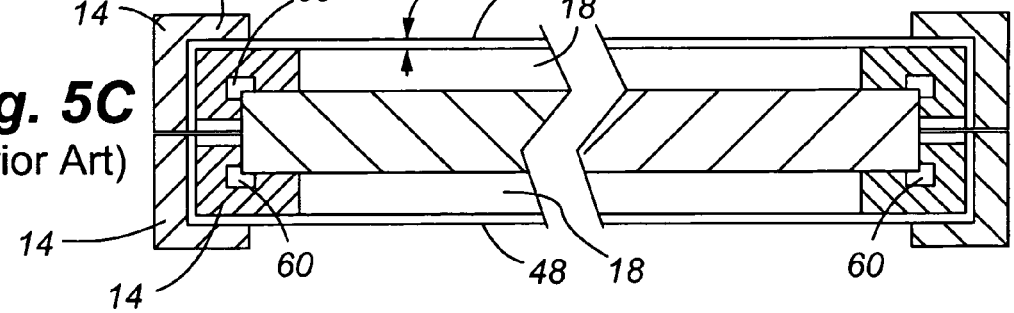
FIG. 5C is a front cross sectional view, similar to that of FIG. 4, showing a third prior art embodiment of a shock absorber system.

Disk drives are susceptible to physical shocks, particularly high amplitude, short duration shocks associated with dropping the disk drive onto a hard surface. As shown in FIGS. 5A and 5C, a plurality of shock absorbers 16 are positioned between the housing 12 and enclosure 14 to provide protection for the disk drive against physical shocks. As shown in FIGS. 5B and C, shock absorbers 16 may also be positioned outside of the enclosure 14 to provide protection for the disk drive against physical shocks. In the embodiment of FIG. 5B, supports S are needed to position the disk drive housing within the enclosure 14. The outer enclosure 14 is designed to provide additional protection and to facilitate integration of the disk drive and related components into an electronic device, such as a laptop computer or other portable electronic device. Shock absorbing mechanisms 16 also reduce the effects of impact shocks that occur when the electronic device, containing the disk drive is dropped.

Figure 1:
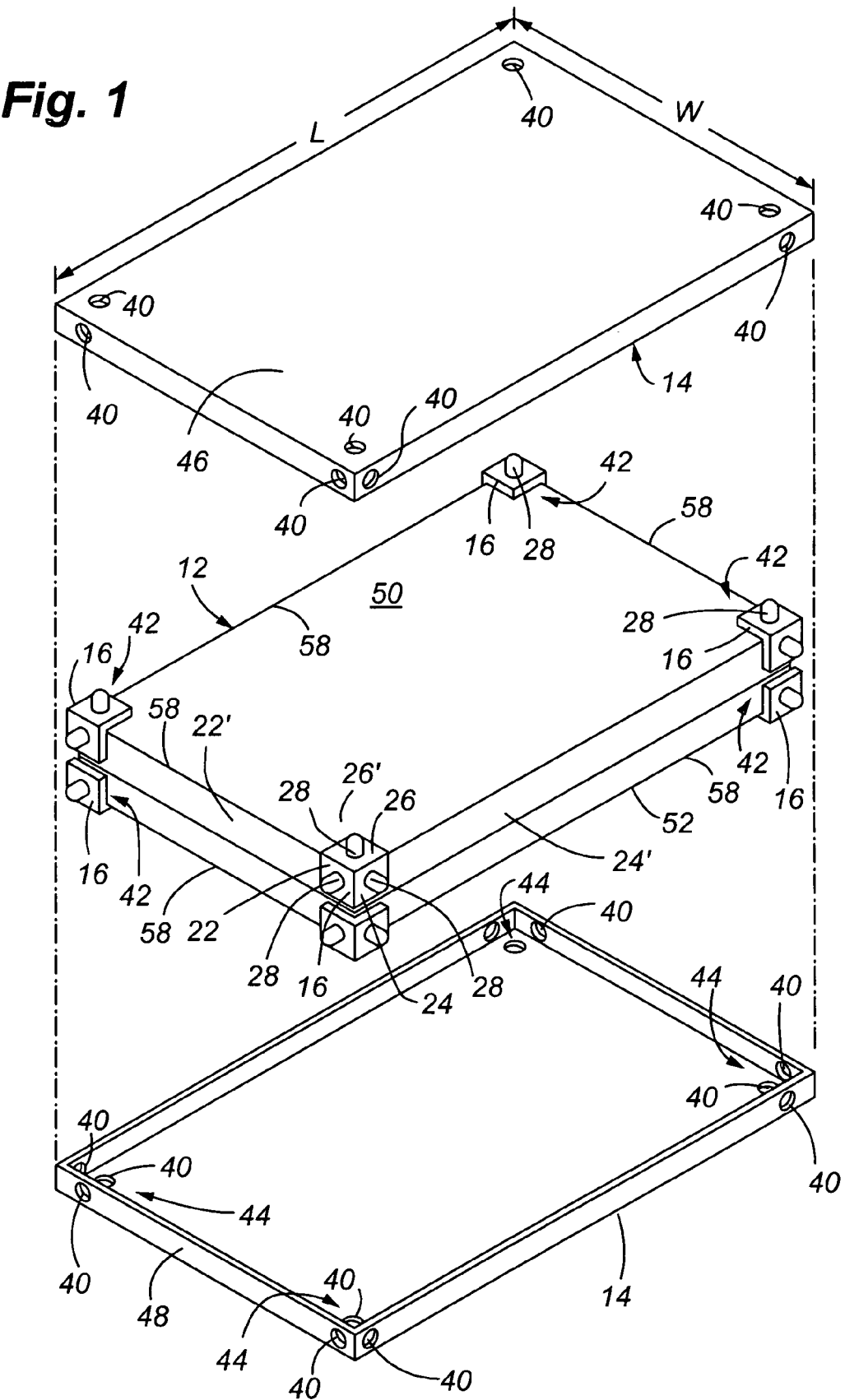
FIG. 1 is an exploded perspective view of a plurality of shock absorbers of the present invention mounted on the exterior corners of a disk drive housing within an outer enclosure.
Figure 2:
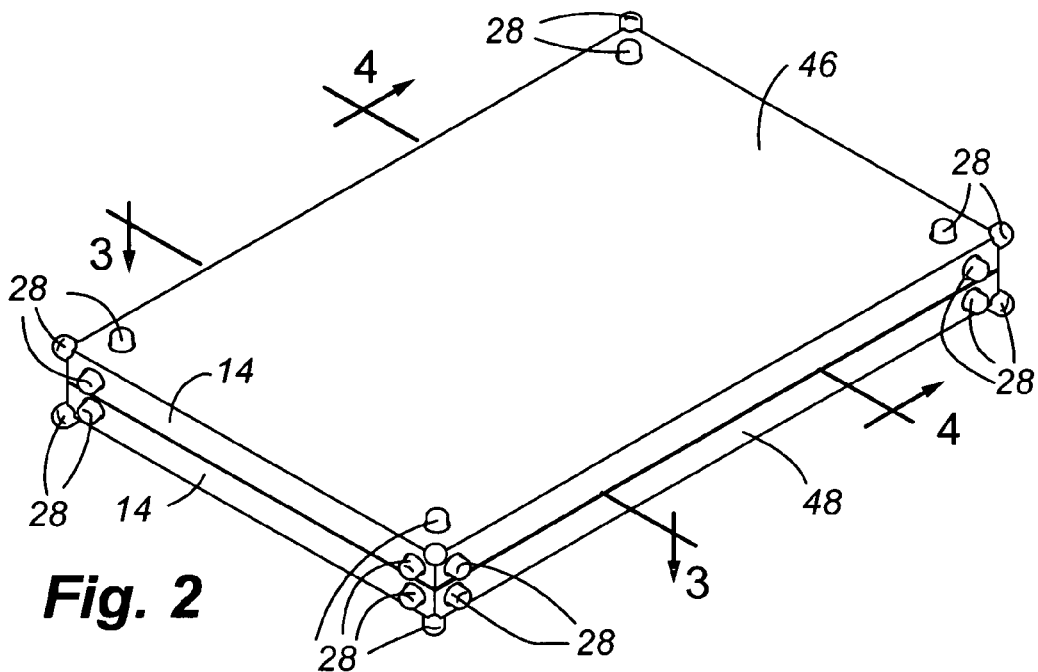
FIG. 2 is a perspective view of an enclosure containing a disk drive sealed within a housing and further illustrating multiple shock absorbers of the present invention extending through the enclosure.

Referring now to FIG. 1, one embodiment of the present invention is shown. As shown, eight shock absorbers 16 are mounted on exterior corners 42 of a disk drive housing 12. Each of the shock absorbers 16 are identical in configuration, although variations in the configurations may be implemented to satisfy design and end use applications. The shock absorbers 16 include three mutually orthogonal body portions 22, 24 and 26 that abut the associated and mutually orthogonal exterior surfaces 22', 24' and 26' of the disk drive housing 12. A plurality of protuberances 28 extend outwardly from the three body portions 22, 24 and 26. In the preferred embodiment of a corner shock absorber, shown in FIG. 6, a protuberance 28 extends outwardly from each portion 22, 24 and 26, and at the corners where edges 30, 32 and 34 join and where edges 34, 36 and 38 join. As shown in FIGS. 1 and 2, the protuberances 28 are designed to extend through openings 40 in the enclosure 14. The protuberances 28 are designed as high points to receive the bulk of the impact load resulting from a drop. Accordingly, the shock absorbers 16 should be disposed at the exterior corners 42 of the housing and the interior corners 44 of the enclosure, or at any location where impact is most likely to occur. The protuberances are preferably generally hemispherical in shape, but other shapes, such as cylinders, tapered bodies or other configurations may also be effective.

Figure 3:
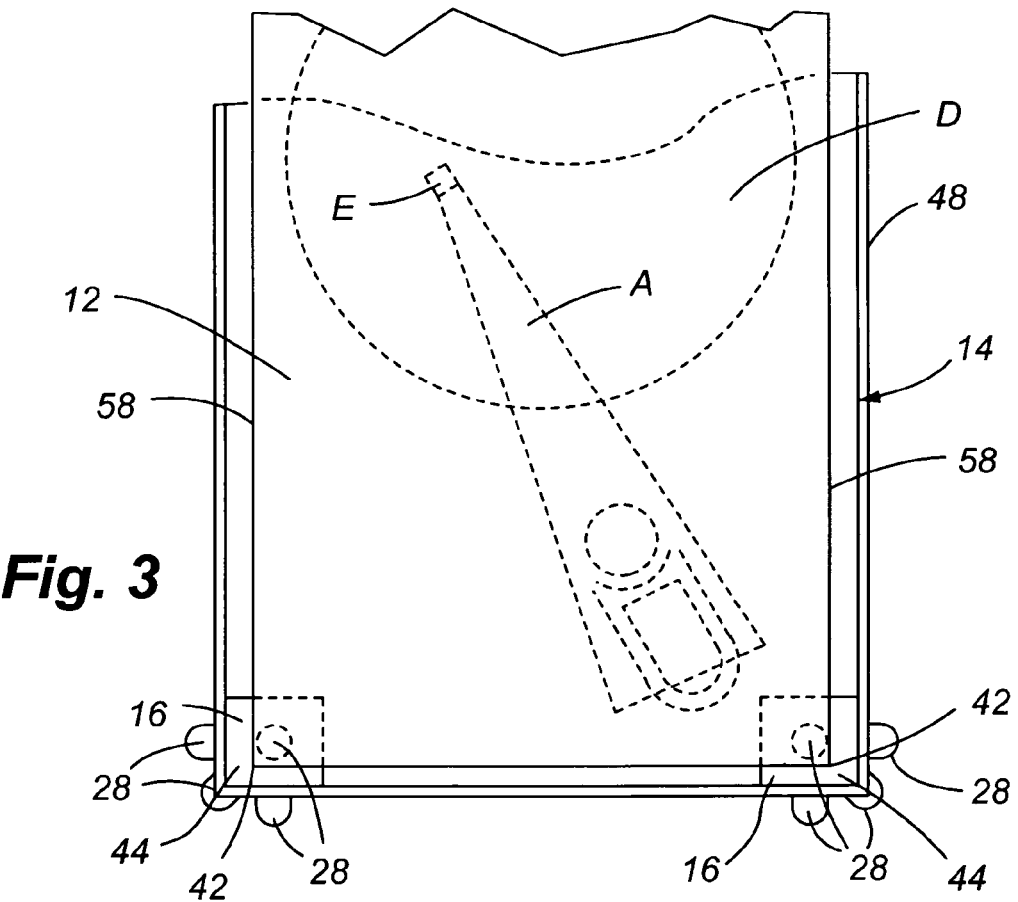
FIG. 3 is a partial top elevation view of a disk drive housing mounted inside the bottom half of an enclosure, taken along line 3-3 of FIG. 2.

It should also be noted that the shock absorbers 16 illustrated in FIGS. 1, 2, 5 and 6 vary in configuration from each other. The embodiments of FIGS. 2 and 3 are the same. The differences are the number and location of the protuberances 28. As will be appreciated by those skilled in the art, upon reading the present disclosure, the number and location of protuberances can change without departing from the scope of the invention.

Referring now to FIG. 3, a top plan view of a disk drive housing 12 utilizing one embodiment of the shock absorbers 16 of the present invention is shown. The upper portion 46 of the enclosure is removed, the lower portion 48 remains. The shock absorbers 16 are positioned on the corners 42 of the disk drive housing 12. The protuberances 28 extend through the openings 40 in the enclosure 14 as a single, integral piece, although the shock absorbers 16 can be made in multiple pieces without departing from the scope of the present invention. It is contemplated that the shock absorbers 16 are located on the corners of the disk drive housing 12 and that locating the shock absorbers on each corner addresses the most likely shock events. However, one skilled in the art, upon reading the present disclosure, will appreciate that shock absorbers 16 may be provided that span the entire length L and/or width W of the disk drive housing 12, or that are intermittently positioned along the length and/or width, as well as on the top surface 50 and/or bottom surface 52 of the housing 12. For example, a second embodiment of the shock absorber 16 is shown in FIG. 7. As seen, this embodiment has two mutually orthogonal body portions 54 and 56, and is designed to fit along an edge 58 of the disk drive housing, rather than at a corner 42. A plurality of shock absorbers of the kind shown in FIG. 7 may be intermittently spaced along the edges of the disk drive or the enclosure, or a single elongate version of this embodiment may extend from one corner to the next of the drive housing or the enclosure. A third embodiment is shown in FIG. 9. A plurality of shock absorbers of the kind shown in FIG. 9 may be positioned on any surface, such as a top, bottom or side surface of the disk drive housing or the enclosure. Alternatively, a larger version may be positioned over all or a substantial portion of a surface. The shock absorbers of the present invention may also be configured as a sleeve that fits around some or all of the disk drive housing or the enclosure. Additional apertures would need to be made in the enclosure to accommodate the additional protuberances of these alternative embodiments.

Referring now to the embodiment of FIG. 4, the disk drive housing 12 is provided within the enclosure 14 and is suspended therein by the plurality of shock absorbers 16. The shock absorbers 16 also may include a cavity 60 to encourage and/or control deflection or deformation of the shock absorber 16 when it is deformed as a result of impact with another object. The number and location of the cavities may be changed to achieve design objectives and depending upon the material used and the configuration of the shock absorber 16. More specifically, as the impact load is applied to the protuberances 28, the shock absorbers 16 are designed to splay or deform, thereby dissipating the energy from the impact load by changing the energy into deformation energy that alters the shape of the shock absorber 16. In an optimized design, the shock absorbers will deform, without bottoming out, and dissipate a sufficient amount of the load to prevent damage to the disk drive. The shock absorbers should achieve this objective in the available space or, in an optimized design, in a smaller or reduced space. Accordingly, the protuberances 28 of the shock absorber 16 are also designed to extend through the thickness of the enclosure 14 through apertures 40. In this way, the compression height of the shock absorber 16 is increased by the thickness of the enclosure, as compared to the prior art systems, where the thickness T of the enclosure is not utilized by the shock absorber. (See, FIGS. 5A, B and C.) As a result, by using the space otherwise filled by the thickness of the enclosure 14, the shock absorbing characteristics of the shock absorber 16 are increased or enhanced without increasing the overall size of the outer envelope. More specifically, a shock absorber having the configuration of FIG. 4 would have superior shock absorbing characteristics compared to the prior art configuration of FIG. 5C, assuming the same exterior dimensions, because of the added compression height of material extending through the enclosure 14. Alternatively, the shock absorbers 16 of the present invention could be reduced in compression height by an amount two times the thickness of the enclosure and still provide the same shock absorption characteristics as provided by the prior art embodiment of FIG. 5C, but simultaneously permitting the exterior envelope to be decreased by this same amount (two times the thickness of the enclosure). Thus, space savings are realized and the end product may be made smaller.

A further alternative embodiment of the shock absorber 16 is shown in FIG. 8. The same concept applies, namely, increasing the compression height of the shock absorber 16 without increasing the overall envelope size, by extending the shock absorbers 16 through the thickness T of the outer enclosure 14. However, the configuration of FIG. 8 generally is the inverse of the configuration of FIG. 6. The mutually orthogonal body portions 22, 24 and 26 are positioned on the exterior of the enclosure 14 and the protuberances 28 extend through the apertures 40 into the space 18 and engage the housing of the disk drive 12.

The shock absorbers 16 generally employed are constructed from a resilient material, such as rubber or having rubber-like qualities. The effectiveness of the protuberances 28 is determined by the spring rate, compression travel and energy dissipation thereof. Thus, the diameter, cross-sectional shape, location, height and quantity of protuberances may change depending upon the numerous factors involved in the design objectives for the end product. Preferably, the protuberances 28 are generally located in the center of the orthogonal portions 22, 24, 26 of the shock absorber 16, and additional protuberances 28 may be positioned at the corners. The shock absorbers 16 may be machined from stock material, or alternatively molded using methods well known in the art. Typically materials include rubbers, visco elastics, foams, urethane elastomers, thermoplastics, vinyl, thermo-set plastics, thermoplastic elastomers, composites, and polyesters. Stiffness and/or hardness depends on the application and design characteristics. Preferably, the shock absorbers are attached by a friction fit, although an adhesive may be used.

Although the embodiments of FIGS. 6-9 are shown as integral, single shock absorbers, the body portions 22, 24 and 26 (FIGS. 6 and 8) or 54 and 56 (FIG. 7) can be made as separate pieces, such as is shown in FIG. 9. Indeed, a single body portion, such as 22, may be used independently on any surface of the housing 12 or enclosure 14 The embodiments of FIGS. 6-9 may also be used together or separately as those of skill in the art would appreciate upon reading the present disclosure.

While various embodiment of the present invention have been described in detail, it is apparent that modifications and alterations of those embodiments will occur to those skilled in the art. However, it is to be expressly understood that such modifications and alterations are within the scope and spirit of the present invention, as set forth in the following claims.

What is claimed is:

1. An electronic drive comprising:
   a housing configured to house components of the electronic device, the housing having an exterior surface;
   an outer enclosure having an inside surface and an outside surface configured to enclose the housing, the outer enclosure having at least one opening that extends between the inside surface and the outside surface;
   at least one shock absorber comprising:
      a body having at least two body portions coupled mutually orthogonally to each other at a common edge, wherein both of the body portions abut the exterior surface of the housing or the outside surface of the outer enclosure; and
      at least one shock absorbing protuberance coupled to and projecting from at least one of said body portions, the at least one shock absorbing protuberance extending from one of the at least two body portions through the at least one opening of the outer enclosure.

2. The electronic device of claim 1, wherein said body of the at least one shock absorber comprises first, second and third mutually orthogonal body portions.

3. The electronic device of claim 2, wherein each of the first, second and third mutually orthogonal body portions comprise an outwardly facing surface and an inwardly facing surface, the inwardly facing surface being in contact with the exterior surface of the housing or the outside surface of the outer enclosure.

4. The electronic device of claim 2, further comprising a shock absorbing protuberance coupled to and projecting from each of the first, second and third mutually orthogonal body portions, each shock absorbing protuberance extending from each of the body portions through said at least one openings in the outer enclosure.

5. The electronic device of claim 2, wherein said first and second body portions are coupled mutually orthogonally to each other to form a first edge, the third body portion is coupled to the first body portion to form a second edge and the third body portion is coupled to the second body portion to form a third edge, wherein the first, second and third edges intersect to form a corner, wherein said body includes a shock absorbing protuberance coupled to and projecting from said corner.

6. The electronic device of claim 1, wherein said at least one shock absorbing protuberance has a shape substantially comprising at least one of the following: hemispherical, cubic, cylindrical, tubular and prismatic.

7. The electronic device of claim 1, wherein each of the at least two body portions of the shock absorber are in contact with both the exterior surface of the housing and the inside surface of the outer enclosure, said at least one shock absorbing protuberance projects outwardly from at least one of the at least two body portions through the at least one opening in the outer enclosure.

8. The electronic device of claim 1, wherein each of the at least two body portions of the shock absorber are in contact with the outside surface of the outer enclosure, said at least one shock absorbing protuberance projects inwardly from at least one of the at least two body portions through the at least one opening in the outer enclosure towards the exterior surface of the housing.

9. The electronic device of claim 1, comprising a shock absorbing protuberance coupled to and projecting from each of the at least two orthogonal body portions.

10. The electronic device of claim 9, further comprising a shock absorbing protuberance coupled to and projecting from said common edge.

11. A data storage system comprising:
  data storage components disposed within a housing having an exterior surface;
  said housing disposed within and enclosed by an outer enclosure, said outer enclosure having an inside surface and an outside surface, the distance between the inside surface and the outside surface defines an outer enclosure thickness, at least one aperture formed in said outer enclosure between the inside surface and the outside surface; and
  at least one shock absorber body positioned between said exterior surface of said housing and said inside surface of said outer enclosure and including at least one shock absorbing protuberance coupled to the body and originating from the body and extending through said at least one aperture a distance greater than said outer enclosure thickness, wherein the at least one shock absorber body includes at least two body portions mutually coupled orthogonally to each other at a common edge and the at least one shock absorbing protuberance coupled to and extending from each body portion.

12. The data storage system of claim 11, wherein the exterior surface of said housing comprises a first and second end surface, a first and second side surface and a top and bottom surface, said first and second end surfaces, said first and second side surfaces and said top and bottom surfaces forming a plurality of corners of said housing, and said body of the at least one shock absorber disposed on at least one corner of the housing.

13. The data storage system of claim 12, wherein the at least one shock absorber body further comprises a plurality of shock absorber bodies, each body disposed at each of the plurality of corners.

14. An electronic device comprising:
  electronic device components disposed in a housing having an exterior surface;
  an enclosure having an interior surface and an exterior surface that defines an enclosure thickness, the housing disposed in and enclosed by the enclosure;
  a plurality of apertures extending between the interior surface and the exterior surface of said enclosure; and
  at least one shock absorbing device including a body positioned in contact with the exterior surface of the housing and in contact with the interior surface of the enclosure, the at least one shock absorbing device having a plurality of shock absorbing protuberances coupled to the body and extending from the body through each of the plurality of apertures in the enclosure, each shock absorbing protuberance having a length greater than the thickness of said enclosure.

15. The electronic device of claim 14, wherein the body of said at least one shock absorbing device has at least two body portions coupled mutually orthogonally to each other, each body portion having an inwardly facing surface and an outwardly facing surface, the inwardly facing surface is in contact with said exterior surface of said housing and said outwardly facing surface is in contact with said interior surface of said enclosure.

16. The electronic device of claim 14, wherein each shock absorbing protuberance that is coupled to the body and extending from the body through each of the plurality of apertures extends outwardly from the exterior surface of the enclosure.

17. An electronic device comprising:
  electronic device components disposed in a housing having an exterior surface;
  an enclosure having an interior surface and an exterior surface that defines an enclosure thickness, the housing disposed in and enclosed by the enclosure;
  at least one aperture extending between the interior surface and the exterior surface of said enclosure; and
  at least one shock absorbing device including a body positioned in contact with the exterior surface of the enclosure and having a shock absorbing protuberance formed with the body and extending from the body through the at least one aperture in the enclosure, the shock absorbing protuberance having a length greater than the thickness of said enclosure.

18. The electronic device of claim 17, wherein the shock absorbing protuberance is positioned in a space between the exterior surface of the housing and the interior surface of the enclosure.

19. The electronic device of claim 17, wherein the body of said at least one shock absorbing device has at least two body portions coupled mutually orthogonally to each other, each body portion having an inwardly facing surface and an outwardly facing surface, the inwardly facing surface is in contact with said exterior surface of said enclosure and the outwardly facing surface faces outwardly from the enclosure.

20. The electronic device of claim 17, wherein the at least one aperture of the enclosure comprises a plurality of apertures and the body of the shock absorbing device includes at least one shock absorbing protuberance coupled to the body and extending from the body through each of the plurality of apertures.

21. The electronic device of claim 20, wherein each protuberance coupled to each body portion and extending through each of the plurality of apertures contacts the exterior surface of the housing.

* * * * *

UNITED STATES PATENT AND TRADEMARK OFFICE
CERTIFICATE OF CORRECTION

| | |
|---|---|
| PATENT NO. | : 7,471,509 B1 |
| APPLICATION NO. | : 11/240752 |
| DATED | : December 30, 2008 |
| INVENTOR(S) | : Daniel B. Oliver |

It is certified that error appears in the above-identified patent and that said Letters Patent is hereby corrected as shown below:

Col. 8, line 31, delete "drive" and insert --device--.

Col. 8, line 62, delete "openings" and insert --opening--.

Signed and Sealed this

Seventh Day of December, 2010

David J. Kappos
*Director of the United States Patent and Trademark Office*